(12) United States Patent
Parsons et al.

(10) Patent No.: US 10,712,517 B2
(45) Date of Patent: *Jul. 14, 2020

(54) CABLE SPOOL RE-ORIENTATION DEVICE FOR A WALL BOX

(71) Applicant: CommScope Technologies LLC, Hickory, NC (US)

(72) Inventors: Thomas Parsons, Leominster, MA (US); Matthew J. Holmberg, Le Center, MN (US); James J. Solheid, Lakeville, MN (US); Douglas C. Ellens, Buffalo, MN (US); Thomas G. Leblanc, Westminster, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,376

(22) Filed: Jun. 18, 2019

(65) Prior Publication Data

US 2019/0369348 A1 Dec. 5, 2019

Related U.S. Application Data

(63) Continuation of application No. 15/747,064, filed as application No. PCT/US2016/043382 on Jul. 21, 2016, now Pat. No. 10,330,880.

(Continued)

(51) Int. Cl.
*G02B 6/44* (2006.01)
*G02B 6/38* (2006.01)

(52) U.S. Cl.
CPC .............. *G02B 6/4446* (2013.01); *G02B 6/44* (2013.01); *G02B 6/4457* (2013.01); *G02B 6/3897* (2013.01)

(58) Field of Classification Search
None
See application file for complete search history.

(56) References Cited

U.S. PATENT DOCUMENTS

| 4,381,087 A | 4/1983 | Williams |
| 7,079,745 B1 | 7/2006 | Weinert et al. |

(Continued)

FOREIGN PATENT DOCUMENTS

| CN | 202583564 U | 12/2012 |
| CN | 202837598 U | 3/2013 |

(Continued)

OTHER PUBLICATIONS

International Search Report and Written Opinion of the International Searching Authority for corresponding International Patent Application No. PCT/US2016/043382 dated Nov. 1, 2016, 8 pages.

(Continued)

*Primary Examiner* — Michelle R Connelly
(74) *Attorney, Agent, or Firm* — Merchant & Gould P.C.

(57) ABSTRACT

A telecommunications wall fixture includes a body configured for mounting to a wall, the body defining a mounting surface generally parallel to the wall when mounted. A cable storage spool is rotatably mounted to the body for storage and deployment of cable. A device is used for re-orienting the rotation axis of the spool from being generally perpendicular to the mounting surface to being generally non-perpendicular to the mounting surface, wherein the spool is configured such that the spool can be stored within the body when the spool is oriented to have the rotation axis generally perpendicular to the mounting surface.

9 Claims, 14 Drawing Sheets

Related U.S. Application Data

(60) Provisional application No. 62/196,014, filed on Jul. 23, 2015, provisional application No. 62/243,880, filed on Oct. 20, 2015.

(56) References Cited

U.S. PATENT DOCUMENTS

| | | |
|---|---|---|
| 7,748,660 B2 | 7/2010 | Hendrickson et al. |
| 8,265,447 B2 | 9/2012 | Loeffelholz et al. |
| 2006/0068633 A1* | 3/2006 | Murano ............... H02G 3/123 439/535 |
| 2008/0011514 A1 | 1/2008 | Zheng et al. |
| 2008/0292261 A1 | 11/2008 | Kowalczyk et al. |
| 2008/0315030 A1 | 12/2008 | Hendrickson et al. |
| 2010/0054680 A1 | 3/2010 | Lochkovic et al. |
| 2010/0074587 A1 | 3/2010 | Loeffelholz et al. |
| 2011/0268414 A1 | 11/2011 | Giraud et al. |
| 2012/0032034 A1 | 2/2012 | Smrha et al. |
| 2013/0209049 A1 | 8/2013 | Kowalczyk et al. |
| 2013/0284843 A1 | 10/2013 | Mertesdorf |
| 2013/0284844 A1 | 10/2013 | Holmberg et al. |
| 2015/0093088 A1 | 4/2015 | Matz et al. |
| 2015/0153513 A1 | 6/2015 | Xiao et al. |
| 2015/0177473 A1 | 6/2015 | Smith et al. |
| 2016/0147030 A1 | 5/2016 | Kowalczyk et al. |
| 2017/0285286 A1 | 10/2017 | Haile-Mariam et al. |
| 2018/0143386 A1 | 5/2018 | Coan et al. |

FOREIGN PATENT DOCUMENTS

| | | |
|---|---|---|
| JP | 2004-303629 A | 10/2004 |
| JP | 2005-024978 A | 1/2005 |
| JP | 2009-003452 A | 1/2009 |

OTHER PUBLICATIONS

Extended European Search Report for corresponding European Patent Application No. 16828554.2 dated Mar. 15, 2019, 9 pages.

\* cited by examiner

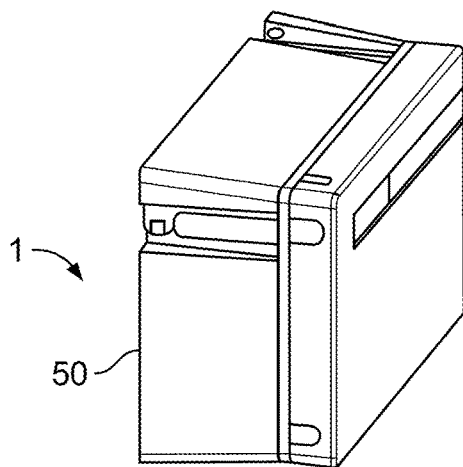
FIG. 1A
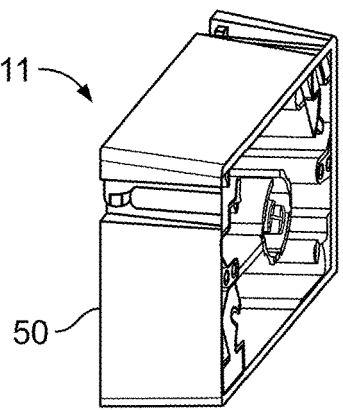
FIG. 1B
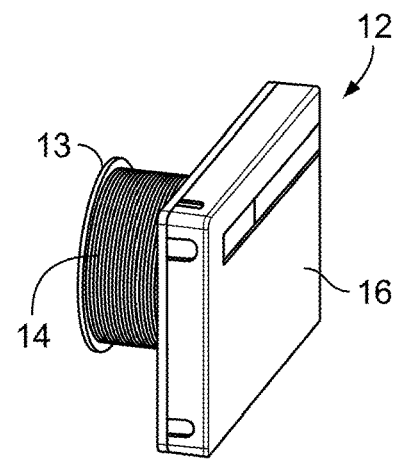
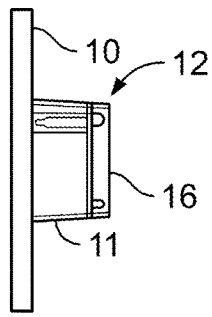
FIG. 1C
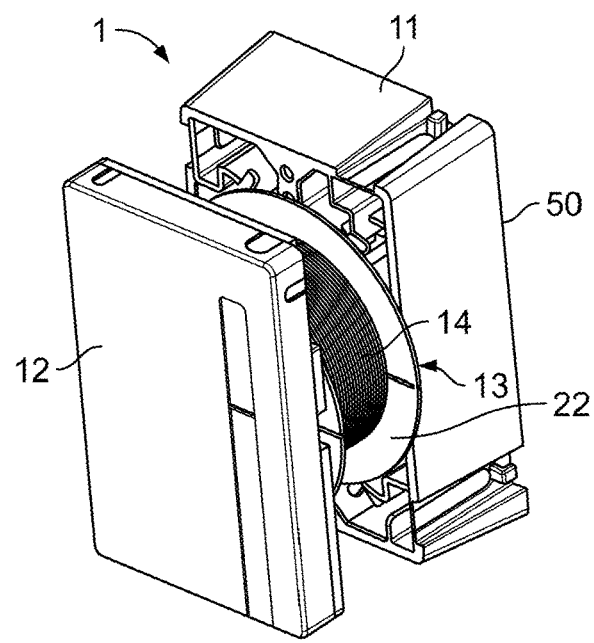
FIG. 1D

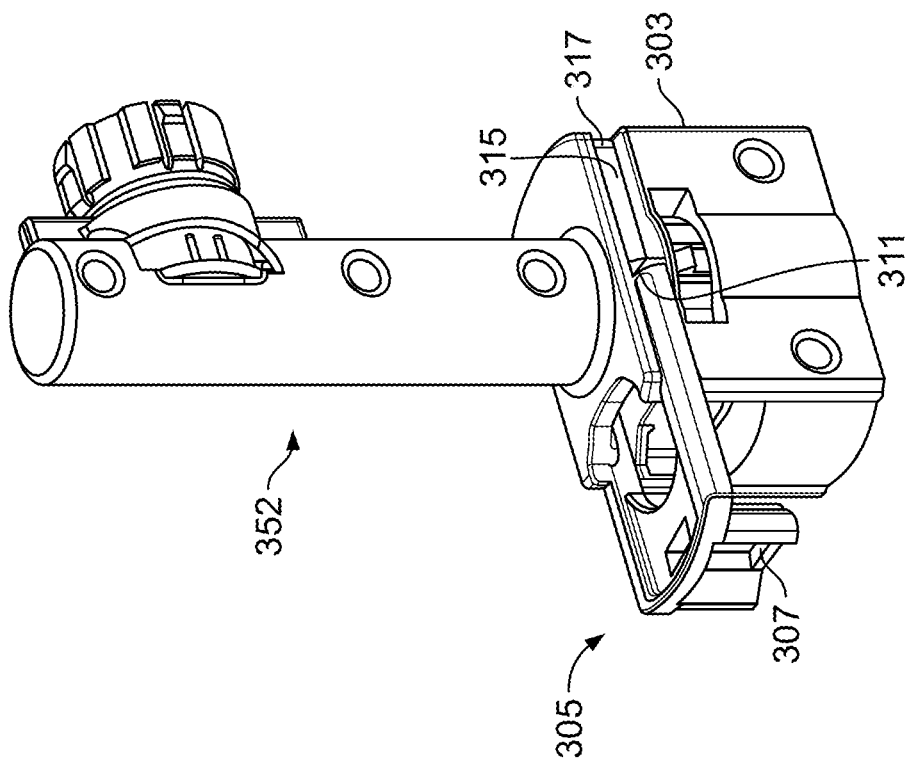
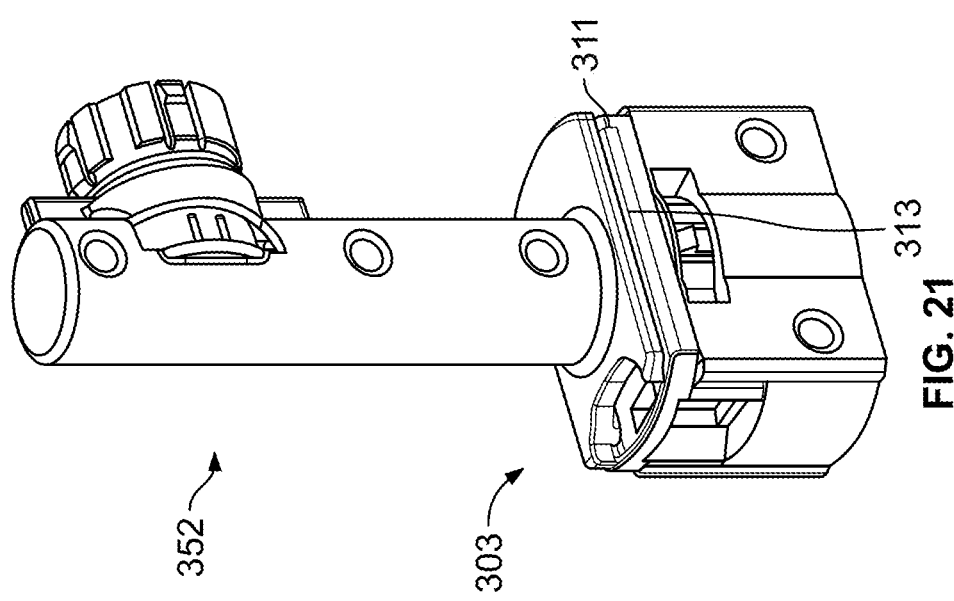

CABLE SPOOL RE-ORIENTATION DEVICE FOR A WALL BOX

CROSS-REFERENCE TO RELATED APPLICATIONS

This application is a Continuation of U.S. patent application Ser. No. 15/747,064, filed on Jan. 23, 2018, now U.S. Pat. No. 10,330,880, which is a National Stage Application of PCT/US2016/043382, filed on Jul. 21, 2016, which claims the benefit of U.S. Patent Application Ser. No. 62/243,880, filed on Oct. 20, 2015, and claims the benefit of U.S. Patent Application Ser. No. 62/196,014, filed on Jul. 23, 2015, the disclosures of which are incorporated herein by reference in their entireties. To the extent appropriate, a claim of priority is made to each of the above disclosed applications.

BACKGROUND

Technical Field

The present disclosure relates to alternative designs for a cable spool re-orientation device, wherein the cable spool is provided on a wall access box and is used in initially storing and then deploying the cable.

Description of the Related Art

In an optical communication network, fibers from an external optical cable are coupled to respective individual user fibers by, for example, splicing. Collectively, these fibers constitute the optical communication network. To splice different fibers together, a fiber optic device is widely applied in the optical communication network, being able to splice fibers in various mounting conditions, such as in air, in pipes and conduits, or in underground environmental conditions.

Conventional fiber optic splicing housings may generally include a fiber storing space and a plurality of splicing device receiving spaces positioned on a tray. The fiber storing space is used to store excess and redundant fiber, and the plurality of splicing device receiving spaces are used to mount fiber splicing devices, such as mechanical splicing devices, fusion splicing devices, etc., for coupling different fibers.

However, the fiber storing device of the conventional fiber optic splicing enclosure is not adapted to store an optical cable having a diameter larger than that of the fiber. Thereby, a predetermined length of redundant optical cable must be reserved outside the splicing enclosure according to an arrangement of the splicing enclosure and a support panel for supporting the splicing enclosure. The conventional design may have several drawbacks. If the reserved redundant optical cable is too short, it may have a disadvantageous effect on the splicing of fibers. If the reserved redundant optical cable is too long, it may be hard to maintain and manage the optical cable and its fiber.

Attempts to address such disadvantages include the use of an external spool for pre-storing the optical cable. However, such external spools are bulky and must be accommodated by the fiber optic splicing housings that are mounted on the mounting wall.

SUMMARY

The inventive features of the present disclosure have been made to overcome or alleviate at least one aspect of the above mentioned disadvantages.

Accordingly, an object of the present disclosure relates to a telecommunications wall box that includes a body configured for mounting to a wall, the body defining a mounting surface generally parallel to the wall when mounted. A cable storage spool is rotatably mounted to the body for storage and deployment of cable. A device is used for re-orienting the rotation axis of the spool from being generally perpendicular to the mounting surface to being generally parallel or non-perpendicular to the mounting surface, wherein the spool is configured such that the spool can be stored within the body when the spool is oriented to have the rotation axis generally perpendicular to the mounting surface.

According to another aspect, the disclosure relates to a cable spool re-orientation device for mounting on a wall fixture for changing the rotational axis of the spool of the wall fixture relative to the wall fixture, the re-orientation device comprising a first end for mounting on the wall fixture, the first end configured to receive at least a portion of a shaft that is used to initially mount the spool to the wall fixture such that spool is oriented for rotation along a plane parallel to a wall mount surface of the wall fixture and a second end configured to removably receive the spool and orient the spool for rotation along a plane generally perpendicular or non-parallel to the wall mount surface.

According to yet another aspect, the disclosure relates to a method of changing the orientation of a cable spool that is rotatably mounted on a wall fixture from a first orientation where the spool is configured to spin along a plane parallel to a mounting surface of the wall fixture to a second orientation where the spool is configured to spin along a plane generally perpendicular or non-parallel to the mounting surface, the method comprising unlatching the spool from the wall fixture when the spool is in the first orientation and latching the spool to the wall fixture in the second orientation.

BRIEF DESCRIPTION OF THE DRAWINGS

The above and other features of the present disclosure will become more apparent by describing in detail exemplary embodiments thereof with reference to the accompanying drawings, in which:

FIG. 1a is an illustrative perspective view of an access box of a cable connection assembly according to an exemplary embodiment of the present invention;

FIG. 1b is an illustrative exploded view of the access box;

FIG. 1c is an illustrative view of the access box in use;

FIG. 1d illustrates the access box with the spool in the extended position prior to storage;

FIG. 21 illustrates another embodiment of a spool re-orientation device having features that are examples of inventive aspects in accordance with the present disclosure, a base portion of the spool re-orientation device shown in a closed position;

FIG. 22 illustrates the spool re-orientation device of FIG. 21 with the base portion thereof in an extended position;

DETAILED DESCRIPTION

Figure 2A:
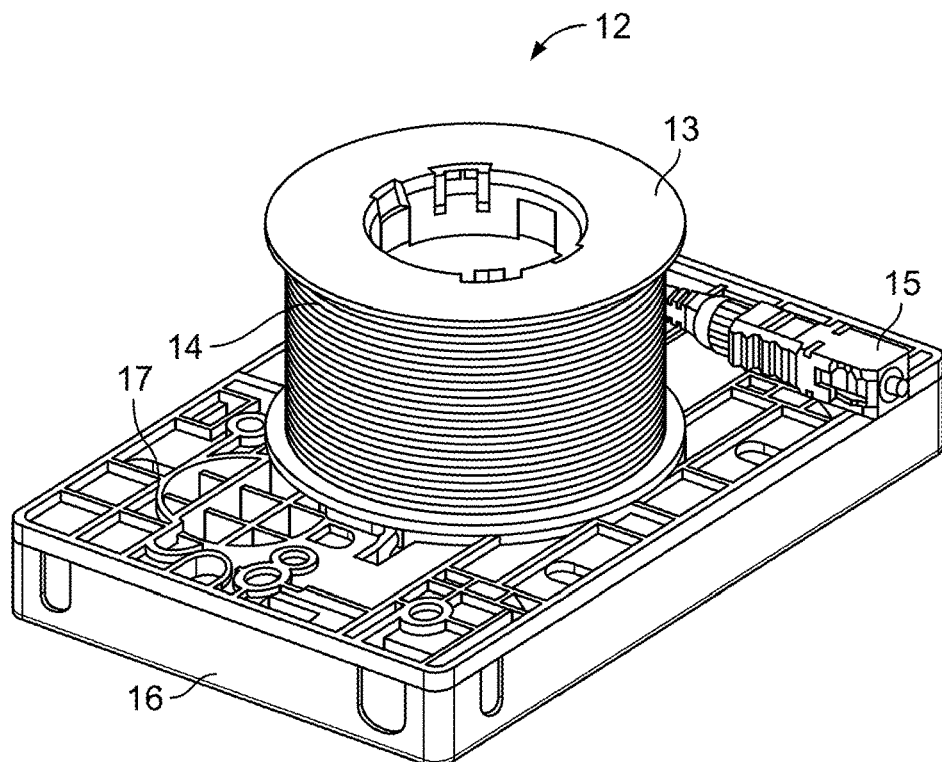
FIGS. 2a and 2b show an illustrative perspective view and an illustrative exploded view of the access boxes of FIGS. 1a-d at different view angles.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

FIGS. 1-6 show illustrative views of an access box of a cable connection assembly according to an exemplary embodiment of the present disclosure. Hereafter, the access box will be described in detail with reference to FIGS. 1-6.

Figure 2B:
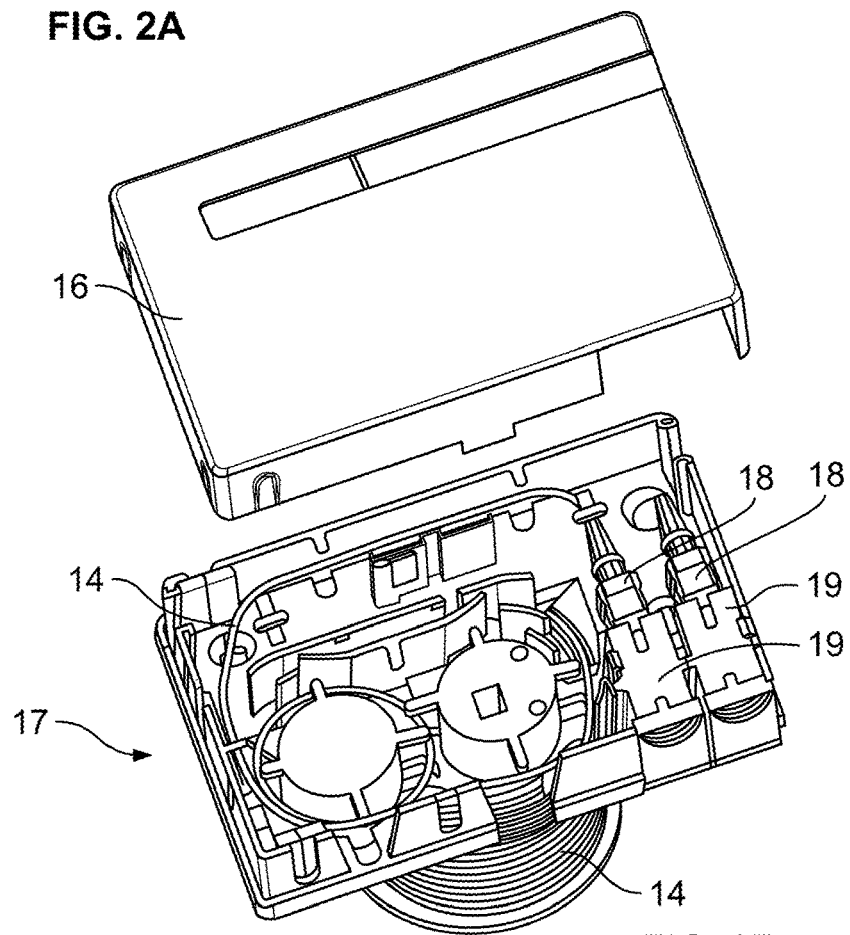
Figure 3:
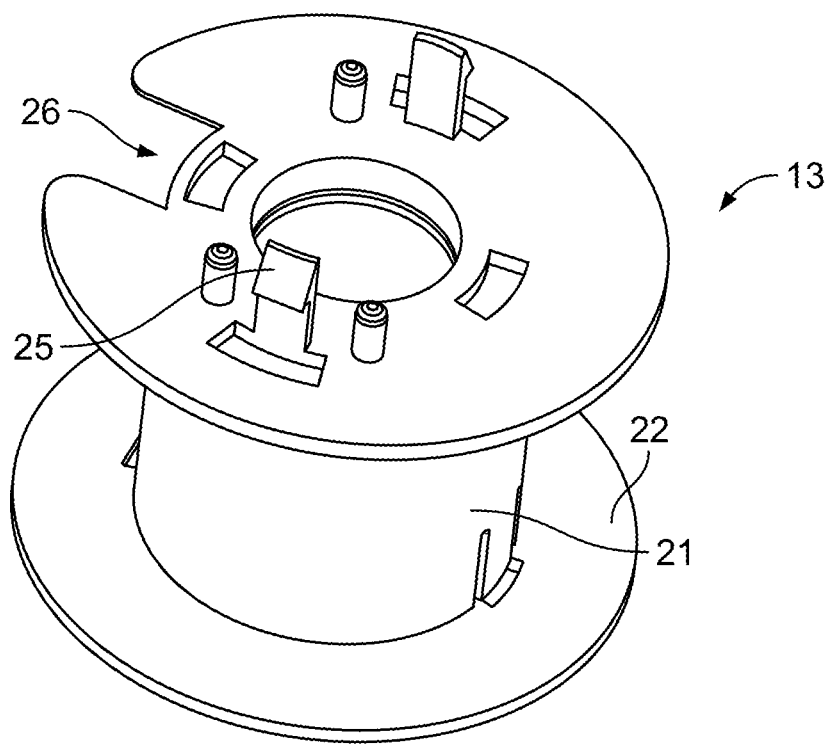
FIG. 3 is a perspective view of the spool of the cable connection assembly.
Figure 4:
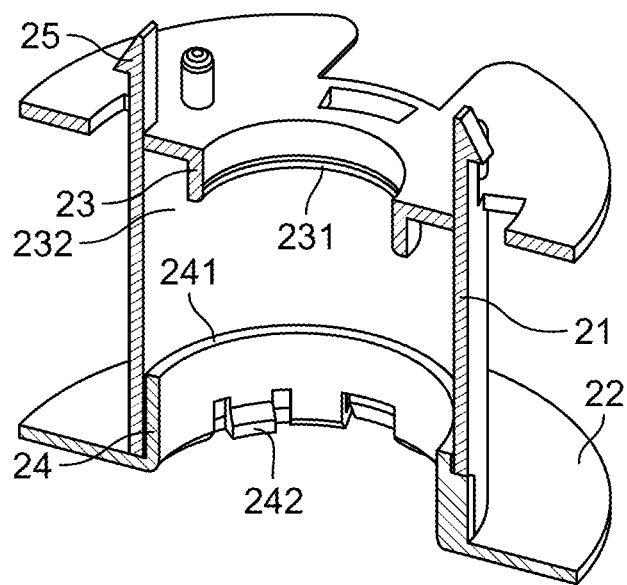
FIG. 4 is a cross-sectional view of the spool.

FIG. 1a is an illustrative perspective view of a wall fixture in the form of a wall access box of a cable connection assembly according to an exemplary embodiment of the present disclosure. FIG. 1b is an illustrative exploded view of the access box shown in FIG. 1a. FIG. 1c is an illustrative view of the access box shown in FIG. 1a in use. FIG. 1d illustrates the access box with the spool in the extended position prior to storage. FIGS. 2a and 2b show an illustrative perspective view and an illustrative exploded view of a cable connection portion and a spool of the access box of FIG. 1 at different view angles.

As shown in FIGS. 1a-1d, in an exemplary embodiment, an access box 1 comprises a seat portion 11 and a cable connection portion 12 configured to be detachably mounted on the seat portion 11. The cable connection portion 12 comprises a spool 13 on which a cable 14 (a first cable) is wound and a connector 15 (see FIG. 2a) for coupling the cable 14 to a second access box (not shown). The spool 13 and the connector 15 both are provided on a body 17 of the cable connection portion 12. The cable connection portion 12 may further comprise a cover 16 covering the outer surface of the body 17 and forming the appearance of the access box 1. Also, as shown in FIG. 2a, the cable 14 may be pre-coupled to the connector 15. The seat portion 11 of the access box 1 is configured to be mounted on the surface of the wall and protruded from the surface of a wall. The seat portion 11 defines a wall mount surface 50.

As shown in FIGS. 2a and 2b, the cable connection portion 12 comprises a body 17 and a cover 16 covering the outer surface of the body 17 and forming the appearance of the access box 1. The spool 13 is provided on one side of the body 17. A free end of the cable 14 wound on the spool 13 is coupled with a connector 15, and the connector 15 is mounted on the one side of the body 17 (see FIG. 2a). Two adapters 19 are provided on the other side of the body 17 opposite to the side provided with the spool 13, and the other end of the cable 14 is pre-coupled to one of the adapters 19 through a connector 18. A termination of a cable (a second cable) from a communication device at a user end can be coupled to the adapter 19. The number of the adapters 19 is not limited to the illustrated embodiment, and may be one, two or more. Although one exemplary embodiment of the access box with reference to the above drawings is described, the access box of the present disclosure is not limited to the illustrated embodiment, as long as an access box comprises a seat portion and a cable connection portion detachably mounted on the seat portion, and the cable connection portion comprises a spool on which a cable is wound.

Referring now to FIGS. 3-6, the spool 13 and a mounting sleeve 4, which is configured to removably receive the spool 13, are illustrated in further detail. The mounting sleeve 4, as will be described in further detail below, is configured to be snap-fit over a support shaft 31 of the seat portion 11 of the access box 1. The mounting sleeve 4 receives the spool 13 with a snap-fit and allows the spool 13 to rotate for deploying the cable 14. In the depicted exemplary embodiment, the mounting sleeve 4 is configured to telescope into the seat portion 11 of the access box such that the spool 13 can be stored within the seat portion 11 of the access box after cable has been unwound therefrom.

Still referring to FIGS. 3-6, as noted above, the seat portion 11 of the wall access box 1 includes a support shaft 31 with a free end, and the spool 13 is rotatably mounted onto the support shaft 31 via the mounting sleeve 4 such that the spool 13 can be axially displaced relative to the support shaft 31 from an expansion to a retraction state. The retraction state is where the spool 13 is positioned in the seat portion 11. The expansion state is where the spool 13 is positioned outside the seat portion 11. When the spool 13 is in the expansion state, an operator can unspool the optical cable or fiber stored on the spool 13. When the spool 13 is in the expansion state, the spool 13 can rotate along a plane generally parallel to the wall mount surface 50 of the seat portion 11.

As noted above, the access box 1 includes the mounting sleeve 4 having a first end slidably connected to the spool 13 in an axial direction, that is, a direction in which the spool 13 is mounted to the support shaft 31, and an opposite second end slidably connected to the support shaft 31 in the axial direction. By displacing the mounting sleeve 4 in the axial direction along the support shaft 31, the operator may pull the spool 13 to a position outside the seat portion 11 of the access box 1 where a redundant optical cable or fiber can be easily reeled on or unreeled from the spool 13. In an embodiment, the spool 13 may be displaced along the support shaft 31, so as to reach the expansion state. The mounting sleeve 4 is movably connected to the support shaft 31, being axially movable, and the first end of the mounting sleeve 4 is rotatably connected to the spool 13. A shape of the mounting sleeve 4 is complimentary or keyed to a shape of the support shaft 31. As such, the mounting sleeve 4 is prevented from rotating relative to the support shaft 31 when the spool 13 is being rotated.

Figure 5:
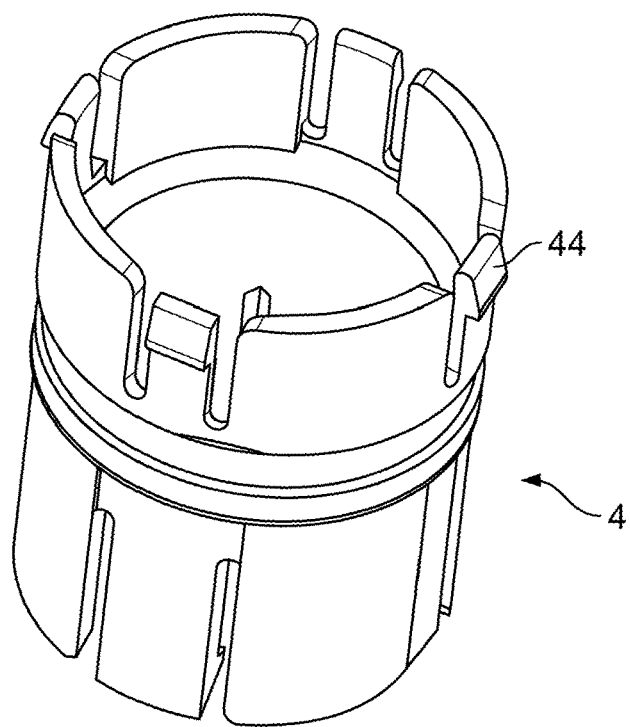
FIG. 5 is a perspective view of a mounting sleeve of the cable connection assembly.
Figure 6:
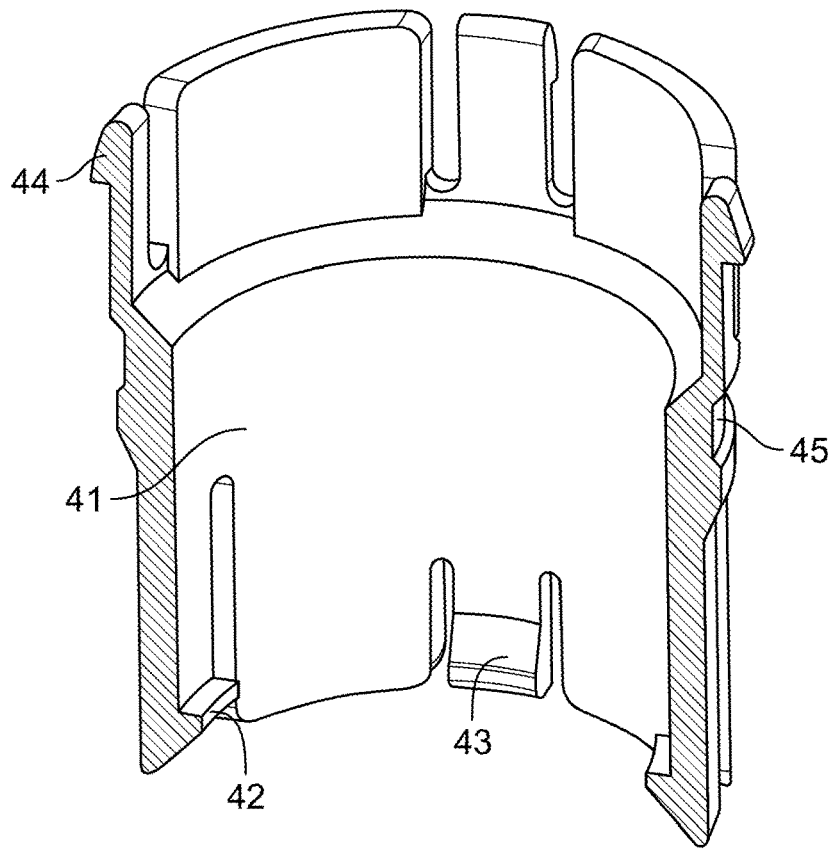
FIG. 6 is a cross-sectional view of the mounting sleeve.
Figure 7:
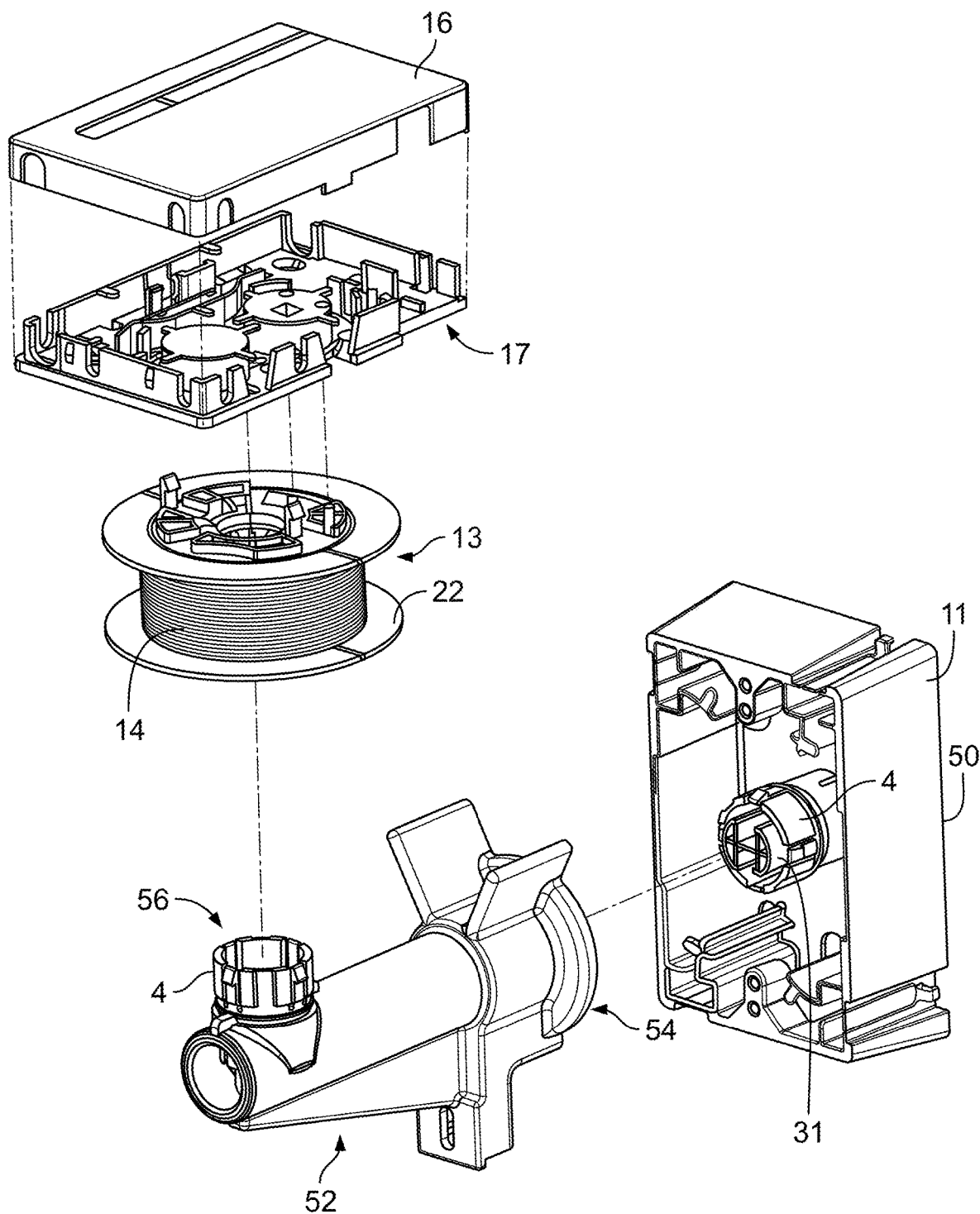
FIG. 7 illustrates an exploded view showing a spool re-orientation device being used with the access box of FIGS. 1-6.
Figure 8:
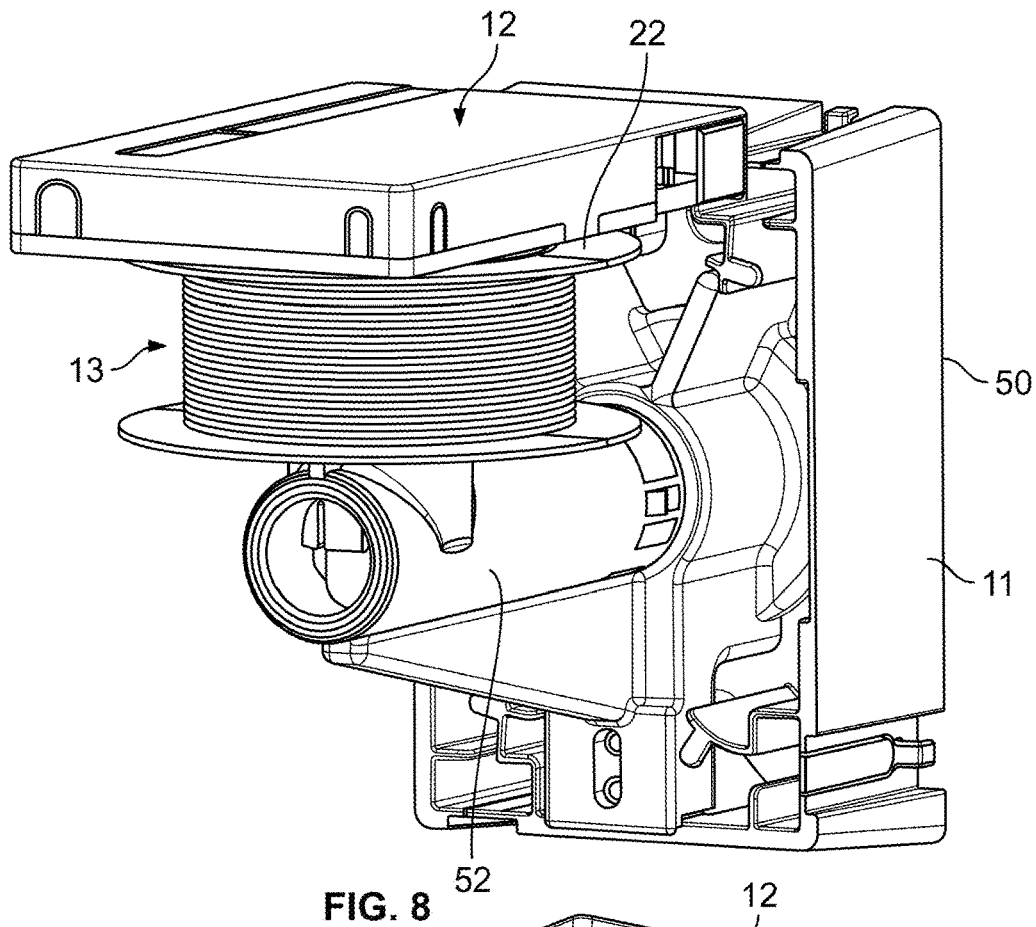
FIG. 8 illustrates a perspective view of the access box of FIG. 7 in an assembled configuration.
Figure 9:
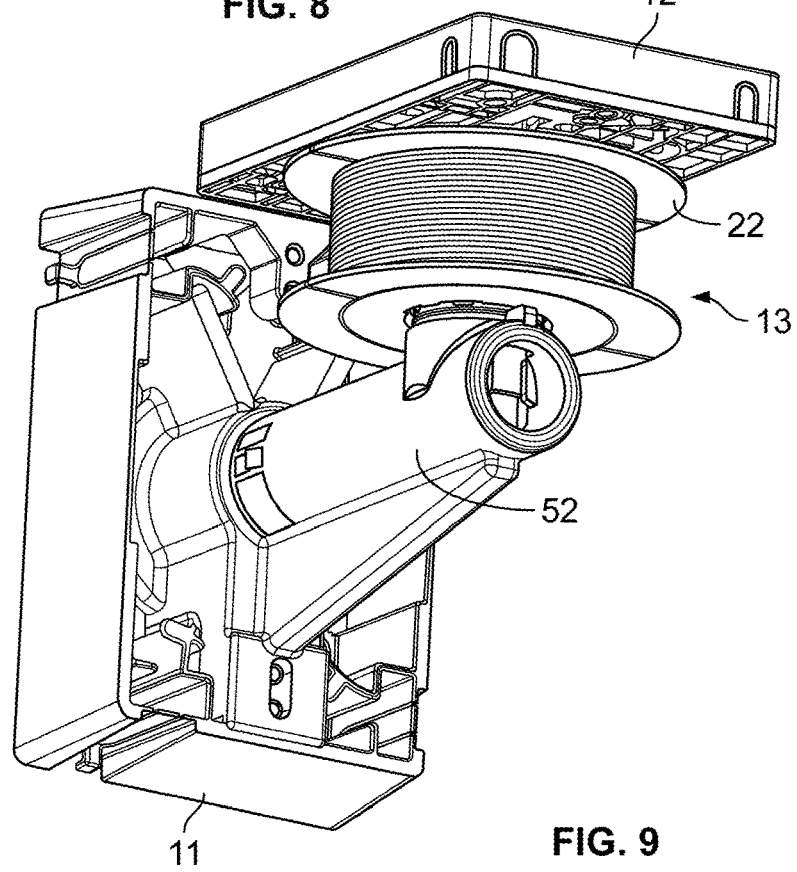
FIG. 9 is another perspective view of the access box of FIG. 8.
Figure 10:
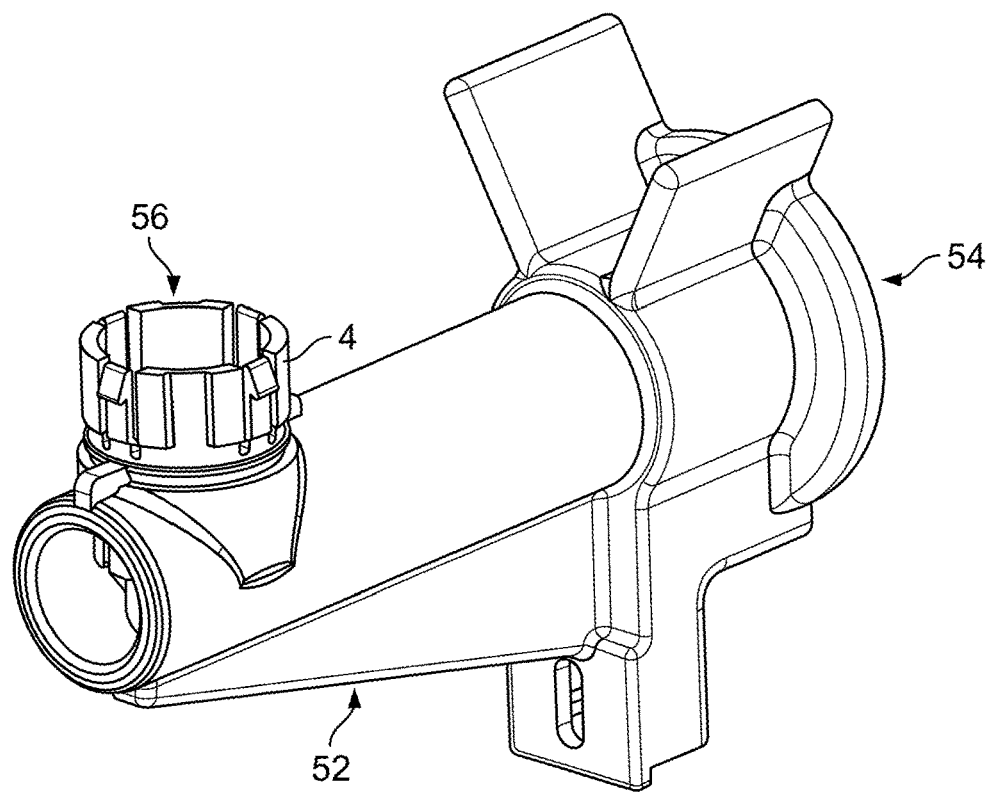
FIG. 10 shows the spool re-orientation device in isolation.

Referring to FIGS. 5-6, the mounting sleeve 4 has a substantially tube-like or sleeve-like structure, and is slidably mounted onto the support shaft 31. Furthermore, a plurality of protrusion receiving grooves extend in the axial direction, the grooves being formed in an inner surface of the mounting sleeve 4 or an outer surface of the support shaft 31. A plurality of complimentary slide protrusions are formed on the other of the inner surface of the mounting sleeve 4 and the outer surface of the support shaft 31. The slide protrusions are positioned in the protrusion receiving grooves when the mounting sleeve 4 is connected to the support shaft 31.

The protrusion receiving grooves are formed in the outer surface of the support shaft 31, and the slide protrusions are formed in the inner surface of the mounting sleeve 4 adjacent to the first end. In this way, the mounting sleeve 4 can be displaced along the axial direction, with the slide protrusions being positioned in the respective protrusion receiving grooves of the support shaft 31. However, the mounting sleeve 4 is prevented from rotating around the axial direction relative to the support shaft 31 because of a blocking function of the slide protrusions. One of ordinary skill in the art would appreciate that the slide protrusions may be formed in the outer surface of the support shaft 31, and the protrusion receiving grooves may be formed in the inner surface of the mounting sleeve 4 adjacent to the first end.

Still referring to FIGS. 5-6, the protrusion receiving grooves formed in the support shaft 31 include at least one first protrusion receiving groove and at least one second protrusion receiving groove, and the slide protrusions formed on the inner surface of the mounting sleeve 4 include at least one first slide protrusion 42 and at least one second slide protrusion 43. During converting the spool 13 from the retraction state to the expansion state or from the expansion state to the retraction state, the first slide protrusion 42 and the second slide protrusion 43 slide in the first protrusion receiving groove and the second protrusion receiving groove, respectively, and prevent the mounting sleeve 4 from being rotated relative to the support shaft 31.

In the embodiment of FIGS. 1-6, the spool 13 has a cylindrical body 21 and flanges 22 formed at opposite ends of the cylindrical body 21. A notch 26 may be formed on the flange 22 positioned on a first end of the reel 2 for the optical cable or fiber to pass therethrough. The first end of the mounting sleeve 4 is positioned in a sleeve receiving passageway (not labeled) extending through the cylindrical body 21, with the mounting sleeve being axially movable.

The cylindrical body 21 has a ring-shaped protruding band 24 circumferentially positioned inside the sleeve receiving passageway on the second end of the cylindrical body 21. The protruding band 24 is rotatably positioned over the outer surface of the mounting sleeve 4, adjacent to the first end of the mounting sleeve 4. An engagement portion 25 is formed on the first end of the spool 13, extending outward from the flange 22, and engaging the body 17 in a snap-in manner.

A plurality of second blocking projections 44 are positioned on the first end of the mounting sleeve 4, and are configured to lock with a circumferential edge 241 of the protruding band 24 positioned proximate to the second end of the cylindrical body 21. The spool 13 is consequently blocked from disengaging from the first end of the mounting sleeve 4 when the spool 13 is in the expansion state. The second blocking projections 44 and the circumferential edge 241 each have a complimentary surface substantially perpendicular to the axial direction.

A plurality of second limiting projections 242 are positioned on the protruding band 24, and a circumferentially extending ring groove 45 is formed in the outer surface of the mounting sleeve 4. When the spool 13 is displaced from the retraction state to the expansion state in the expansion direction, the second limiting projection 242 is received in the ring groove 45 in a snap-fit manner so as to limit further displacement of the mounting sleeve 4 in the retraction direction.

A collar 23 may be positioned in the second end of the cylindrical body 21, extending inward into the sleeve receiving passageway. The collar 23 is spaced a distance away from an inner wall of the cylindrical body 21 defining the sleeve receiving passageway to form a gap 232. When the spool 13 is in the retraction state, the collar 23 is positioned between the second end of the mounting sleeve 4 and the free end of the support shaft 31 so that the spool 13 can be rotated relative to the support shaft 31 and the mounting sleeve 4.

A collar limiting projection 231 is formed on the collar 23, and a complementary third limiting projection is positioned on the free end of the support shaft 31. The collar limiting projection 231 engages with the third limiting projection in a snap-fit manner so as to limit the spool 13 from being removed from the mounting sleeve 4 when the spool 13 is in the retraction state. In this way, the spool 13 can be stably received in the seat portion 11 of the access box 1.

Although the above embodiment describes that the mounting sleeve 4 is not rotatable relative to the support shaft 31 and that the spool 13 is rotatable relative to the mounting sleeve 4, the present disclosure is not limited to this version. In another embodiment, the access box 1 may include a mounting sleeve with a first end which is rotatably and axial-slidably connected to the support shaft, and an opposite second end which is axial-movably connected to the reel and not rotated with respect to the spool.

In another embodiment, the spool 13 may be directly slidably connected to the support shaft. For example, a plurality of protrusion receiving grooves extending in the axial direction are formed in one of an inner surface of the spool and an outer surface of the support shaft, and a plurality of slide protrusions for being slidably fitted in respective protrusion receiving grooves are formed on the other of the inner surface of the spool and the outer surface of the support shaft.

In the assembly described above, the spool 13 may be retracted into the seat portion 11 or expanded out therefrom, facilitating the maintenance and management operation on the redundant optical cable and/or fiber.

Further details regarding the movable mounting of the spool 13 to the support shaft 31 via the mounting sleeve 4 are described in U.S. Patent Application Publication No. 2015/0153513, incorporated herein by reference in its entirety.

During mounting the assembly, the optical cable or fiber 14 may be pre-stored in the spool 13. The optical cable or fiber 14 may be unreeled out of the spool 13 in use and spliced or connected to other devices without calculating the length of the optical cable or fiber to be used, thereby achieving a quick deployment operation. The seat portion 11 of the access box 1 may be mounted on various mounting walls, for example, plasterboards, with different thicknesses. Also, the spool 13 may still be rotatable in the seat portion under the retraction state where it is received in the seat portion.

In addition, the spool 13 may be rotatable relative to the support shaft 31 under the expansion state where it is expanded out of the seat portion 11 so that the optical cable or fiber 14 can be unreeled from the spool.

In the depicted embodiment, during unreeling of the optical cable or fiber, the spool 13 is configured to rotate about a plane that is generally parallel to the wall mount surface 50 defined by the seat portion 11 (and also to the mounting wall). However, in certain applications, the optical cable or fiber that is unwound from the spool 13 may need to go through an opening in the seat portion 11 and directly into the mounting wall. It would be advantageous to provide a solution wherein the spool 13 may be rotated along a plane that is generally perpendicular or at a non-parallel angle to the mounting wall so as to limit the amount of bending stress put on the optical cable or fiber 14 when it is being unreeled toward the wall (i.e., toward the back side of the seat portion 11).

Referring now to FIGS. 7-20, alternative designs for a spool re-orientation device 52, wherein the cable spool 13 may be efficiently brought to a position where the spool 13 is being rotated along a plane that is generally perpendicular or at a non-parallel angle to the mounting wall, are shown.

An example embodiment of one such device 52 is shown in FIGS. 7-10. The device 52 defines a first mounting end or base 54 that is configured for mounting on the support shaft 31 of the seat portion 11 via the mounting sleeve 4 and a second rotation end 56 that is configured to receive the spool 13. The rotation end 56 also utilizes a mounting sleeve similar to mounting sleeve 4 for rotatably receiving the spool 13. The second rotation end 56 is configured to orient the spool 13 at a position that is generally perpendicular to its orientation when the spool 13 is mounted directly to the support shaft 31. When using the device 52, the spool 13 can rotate along a plane that is generally perpendicular to the wall mounting surface 50 of the seat portion 11 such that the optical cable or fiber 14 can be unreeled straight through the seat portion 11 and into the wall.

When the cable 14 has been deployed to the desired length, the re-orientation device 52 may be removed from both the support shaft 31 and the spool 13 and can be stored for later use. The spool 13 can be placed on the mounting sleeve 4 that is around the support shaft 31 and be brought to the retracted position for storing within the seat portion 11.

Figure 11:
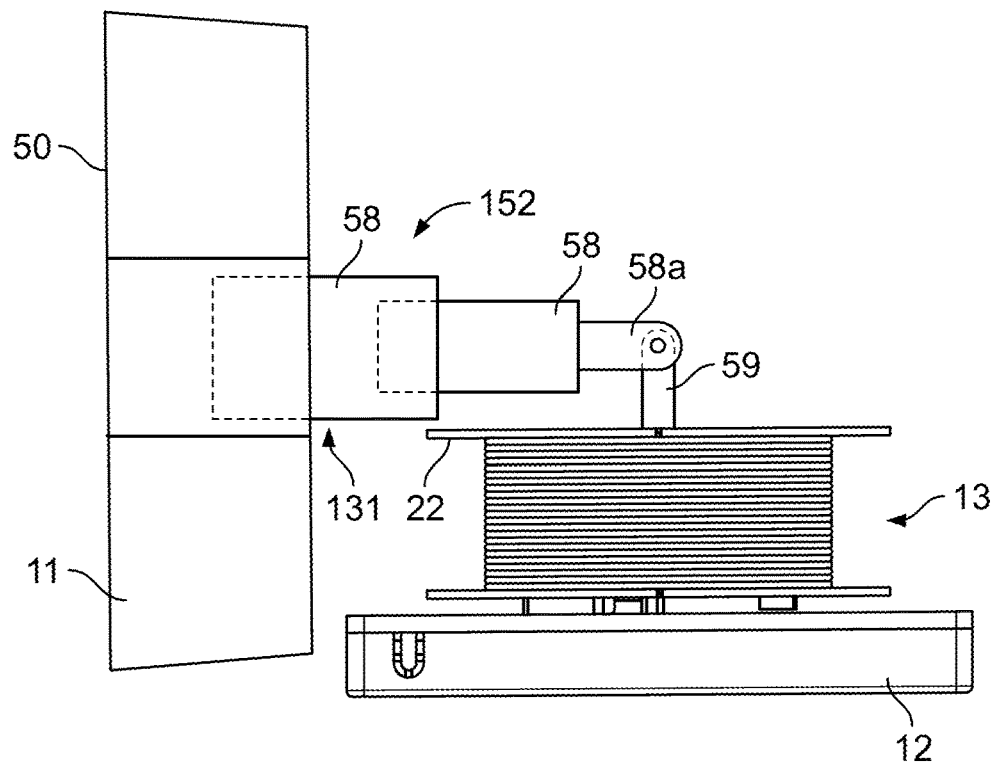
FIG. 11 illustrates another embodiment of a spool re-orientation device having features that are examples of inventive aspects in accordance with the present disclosure, the spool shown in the extended state.
Figure 12:
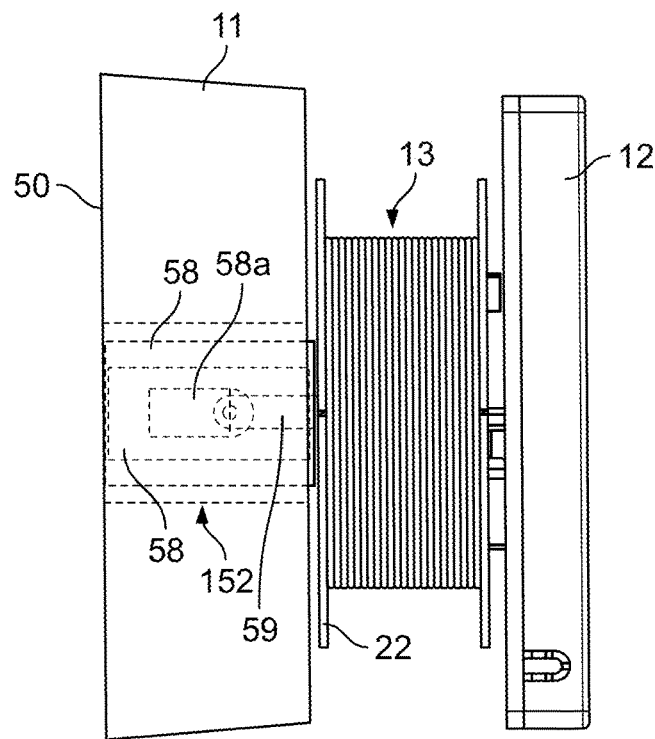
FIG. 12 illustrates the access box of FIG. 11 with the spool re-orientation device in the retracted/collapsed position.
Figure 13:
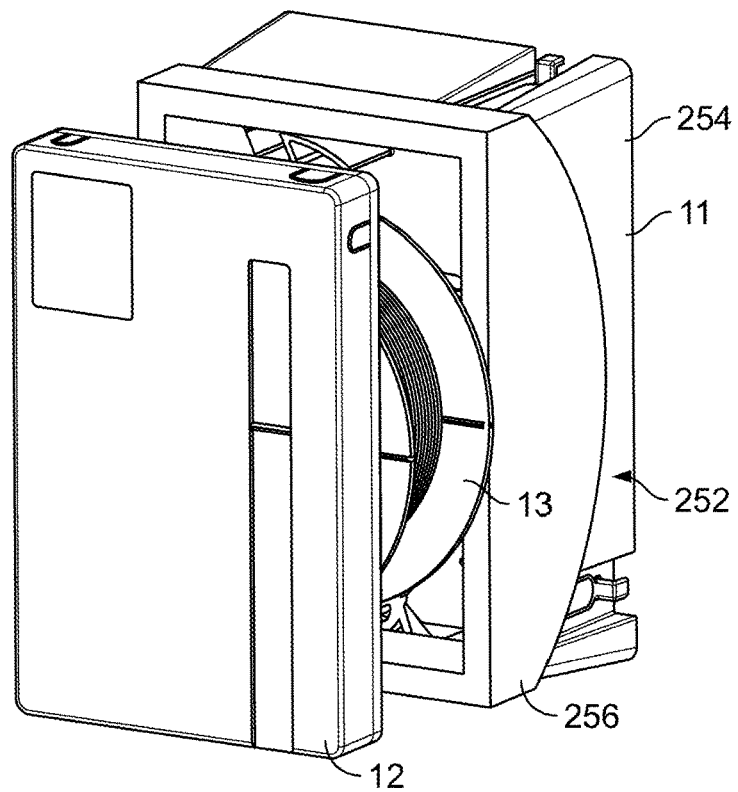
FIG. 13 illustrates yet another embodiment of a spool re-orientation device having features that are examples of inventive aspects in accordance with the present disclosure, the spool re-orientation device shown in the neutral position.
Figure 14:
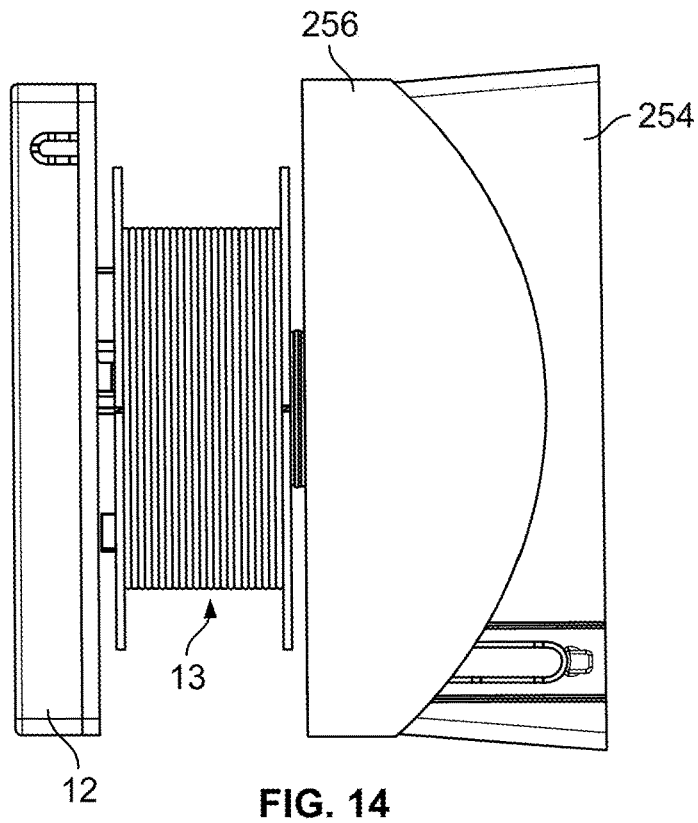
FIG. 14 illustrates a side view of the access box of FIG. 13.
Figure 15:
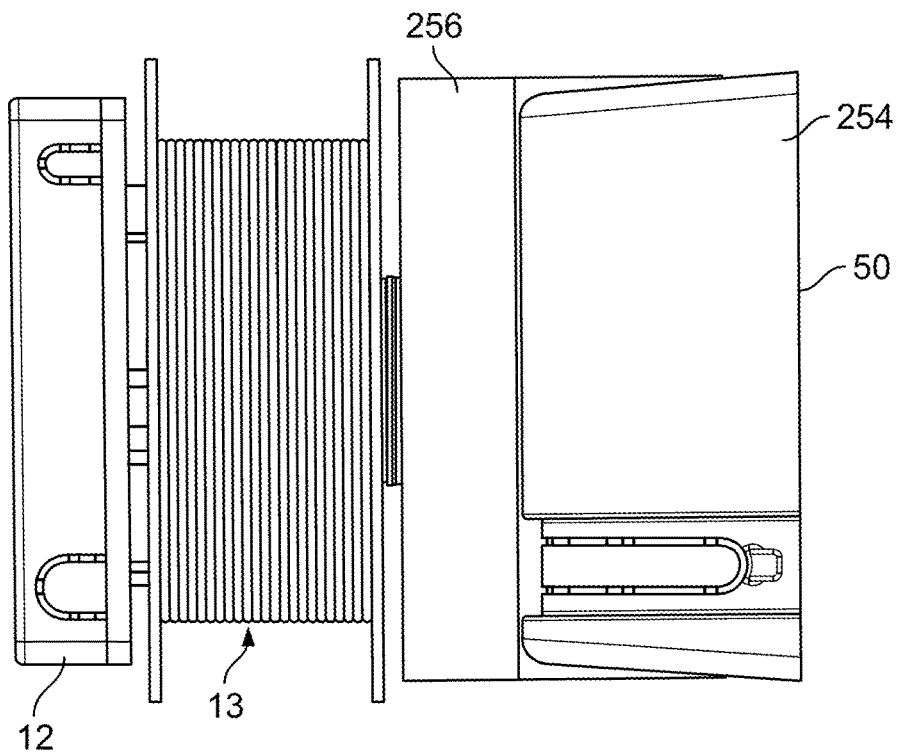
FIG. 15 is a top view of the access box of FIG. 13.
Figure 17:
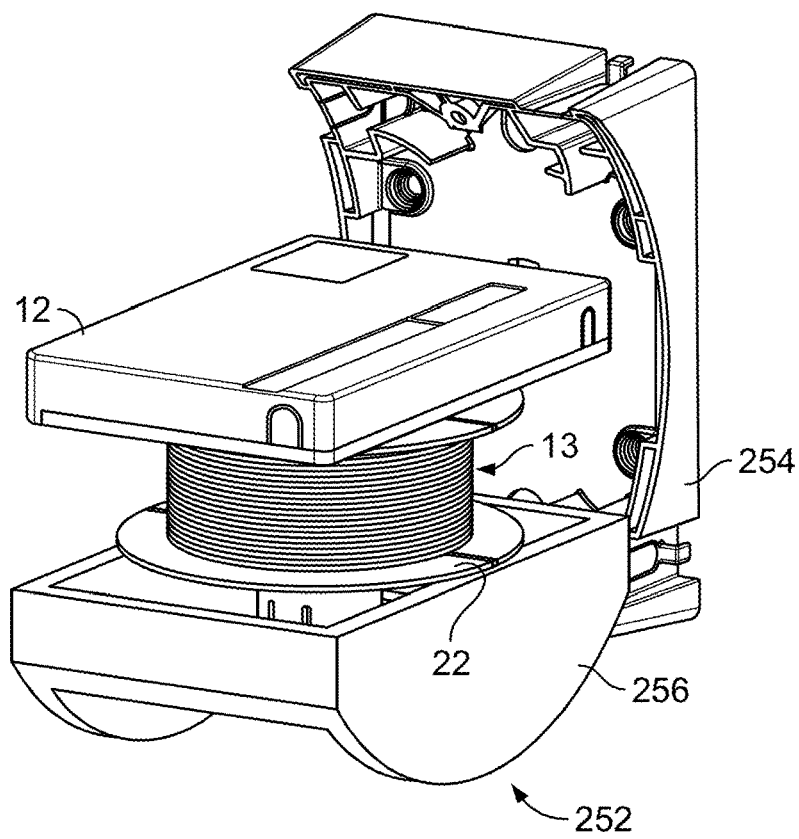
FIG. 17 illustrates the access box of FIG. 13 with the spool re-orientation device in the slidably moved orientation.
Figure 16:
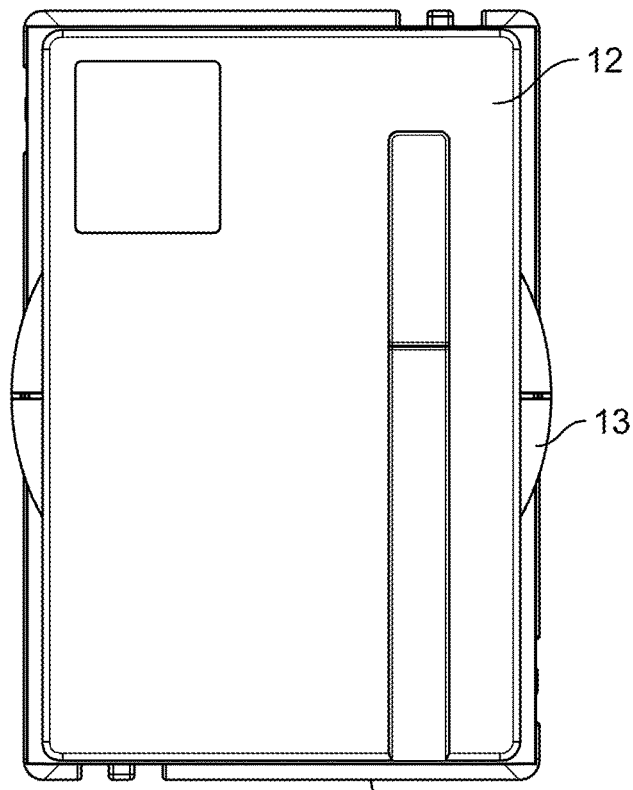
FIG. 16 is a front view of the access box of FIG. 13.
Figure 18:
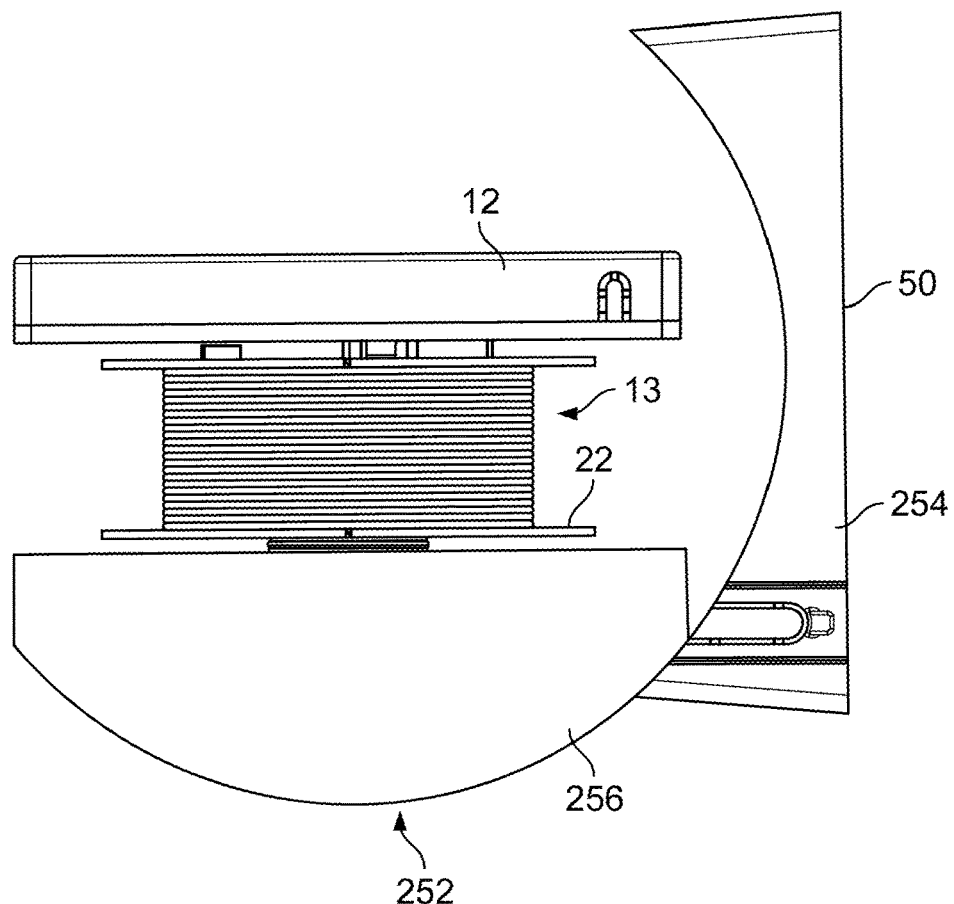
FIG. 18 illustrates a side view of the access box of FIG. 17.
Figure 19:
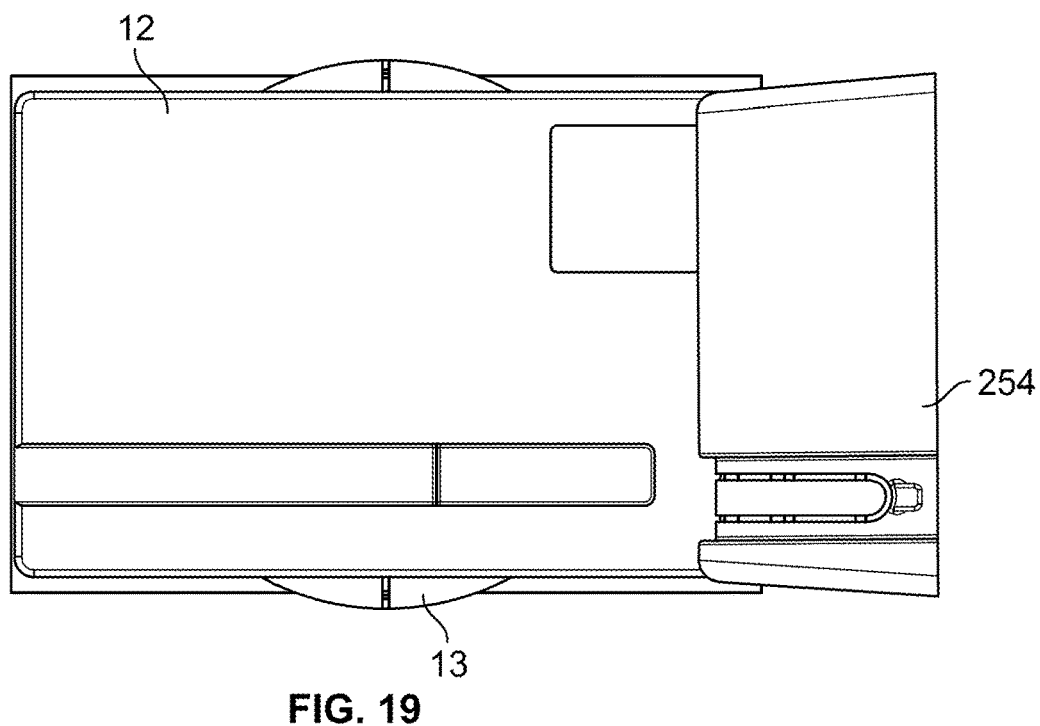
FIG. 19 is a top view of the access box of FIG. 17.
Figure 20:
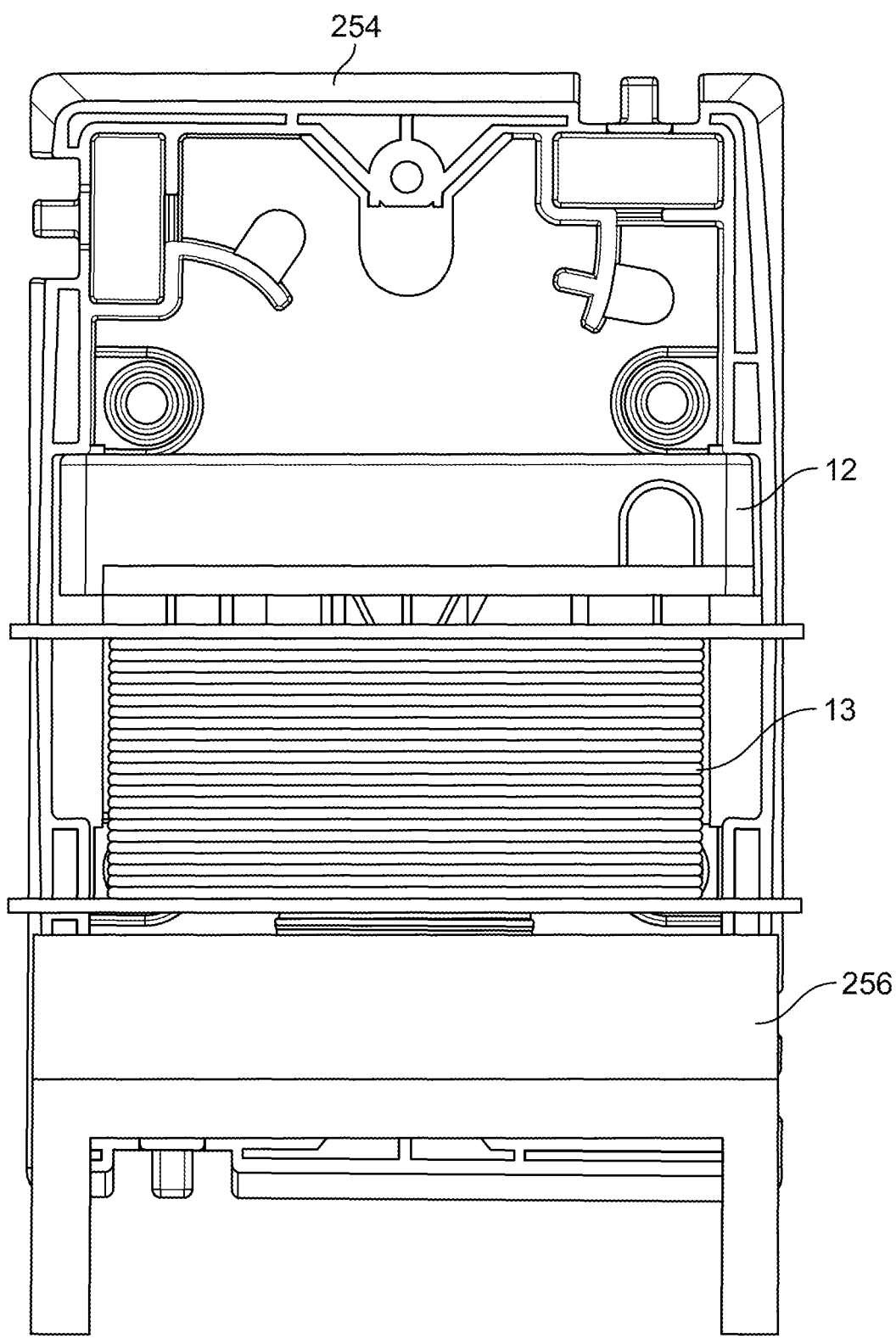
FIG. 20 is a front view of the access box of FIG. 17.

According to another embodiment, a spool re-orientation device 152, rather than being a removable piece, may be provided as an integral part of the access box 1. For example, as shown in FIGS. 11-12, the device 152 may be configured integrally as part of a support shaft 131. In the embodiment shown, the support shaft 131 defines a plurality of telescoping sections 58 that are configured to move the spool 13 away from the seat portion 11 of the access box 1. The topmost telescoping section 58a defines a portion 59 that pivots relative to the rest of the telescoping sections 58 such that the spool 13, once brought to an extended configuration, can be pivoted to an orientation wherein the spool 13 rotates about a plane generally perpendicular or at a non-parallel angle to the wall mounting surface 50 of the seat portion 11 (and the wall).

According to another embodiment of a device 252 that is formed generally integrally with the access box 1, as shown in FIGS. 13-20, the spool reorientation device 252 may be formed as part of the seat portion 11. As shown, according to the depicted embodiment, the seat portion 11 includes a fixed portion 254 and a slidably movable portion 256. The slidably movable portion 256 is configured to support the spool 13 as well as the cable connection portion 12 of the access box 1. The movable portion 256 is configured to slidably move with respect to the fixed portion 254 along a swinging path such that the movable portion 256 can bring the spool 13 from a first orientation where the spool 13 rotates along a plane parallel to the mounting surface 50 of the seat portion 11 to a second orientation where the spool 13 rotates along a plane generally perpendicular or a non-parallel angle to the mounting surface 50 of the seat portion 11. As discussed above, once the cable 14 is deployed, the movable portion 256 can be slidably swung back to its initial position, and the spool 13 can be moved to its retracted position within the seat portion 11.

It should be noted that the fixed portion 254 and the slidably movable portion 256 of the device can be configured such that the slidably movable portion 256 can stop at selected discrete positions along its path while it is being moved from the parallel-to-the-wall orientation. For example, one of the discrete positions may be at a 45 degree angle relative to the mounting surface 50 of the seat portion 11 or the wall. As such, depending upon the cable deployment need or direction, the spool 13 may rotate along planes that are not necessarily perpendicular to the mounting surface 50, such as at 45 degree angle to the mounting surface 50.

It should be noted that in certain embodiments (such as the embodiment shown in FIGS. 7-20), the flanges 22 of the spool 13 may be formed as frangible or breakable structures such that they can be removed before seating the spool 13 within the seat portion 11. The flanges 22, before, being removed, assist with the reeling and retaining of the optical cable 14 around the spool 13.

The spool re-orientation device of the present disclosure may be used with wall fixtures other than wall access boxes and the wall access box 1 described above is simply one example of a wall fixture with which the inventive aspects of the spool re-orientation device may be used.

Referring now to FIGS. 21-24, another embodiment of a spool re-orientation device 352 is illustrated. The embodiment of the device 352 illustrated in FIGS. 21-24 is configured as a removable device such as the device 52 shown in FIGS. 7-10. However, the device 352 includes features that allow the device 352 to be mounted either to the seat portion 11 of a wall access box 1 that mounts to a wall surface (see FIG. 24) or to a cavity mount body 301 (see FIG. 23) that can be mounted within a wall cavity. Thus, in the embodiment of FIG. 23, the wall fixture is provided in the form of the wall cavity mount body 301.

Figure 24:
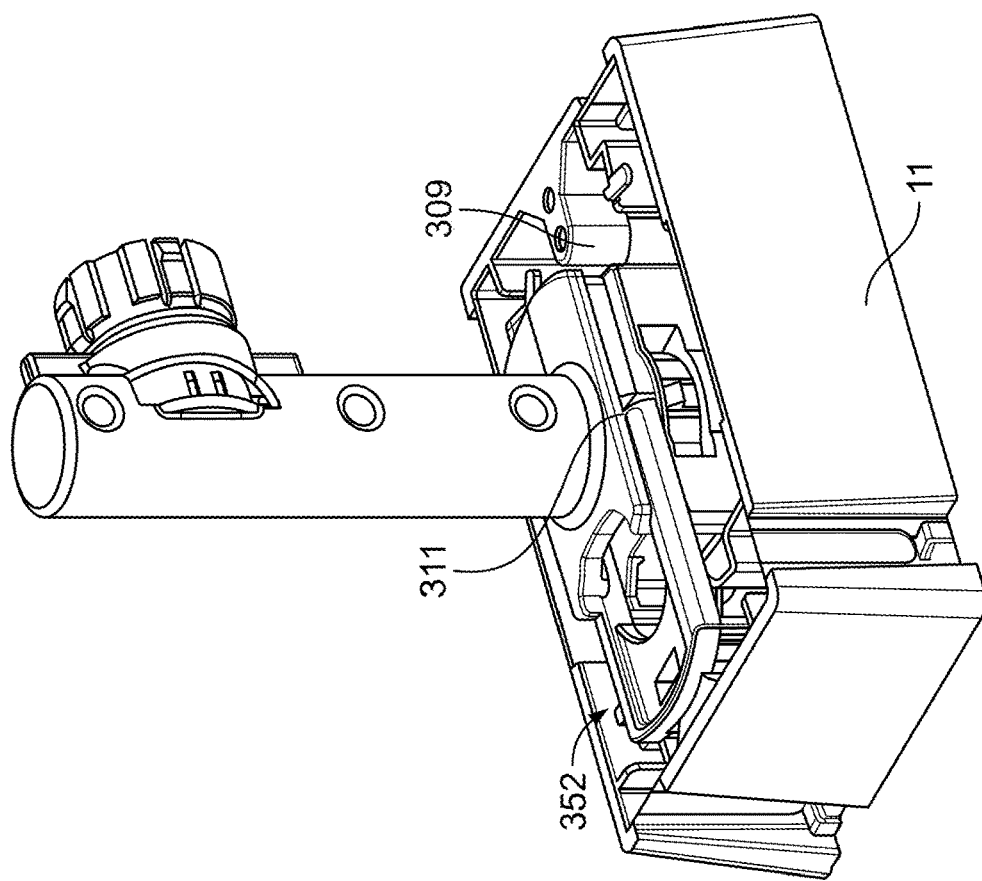
FIG. 24 illustrates the spool-reorientation device of FIGS. 21-22 mounted within the seat portion of an access box configured for mounting on a surface, wherein the base portion of the spool re-orientation device is provided in an extended position for mounting within the access box.
Figure 23:
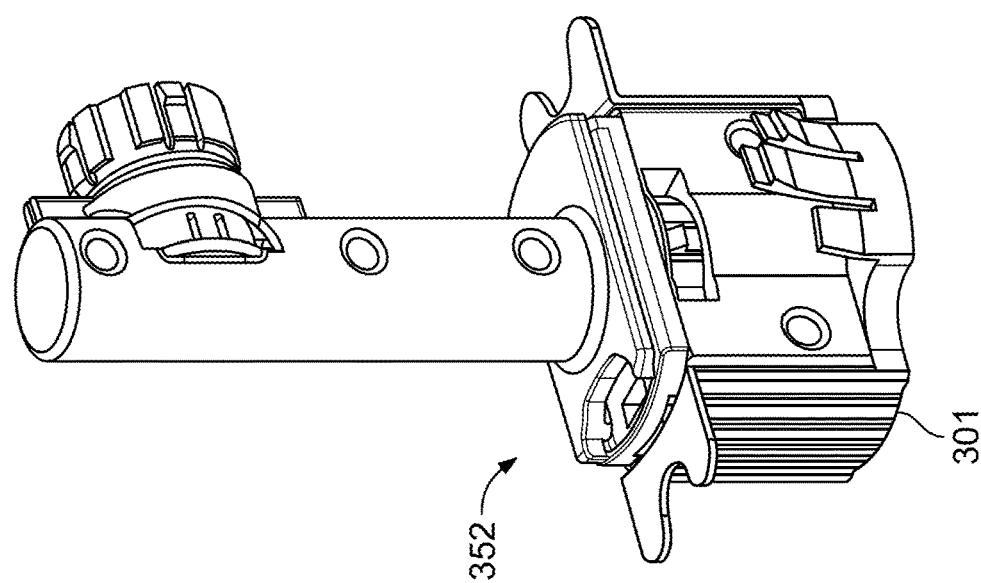
FIG. 23 illustrates the spool re-orientation device of FIGS. 21-22 within a wall cavity mount body with the base portion provided in a closed position.

Referring specifically now to FIGS. 21-22, the device 352 defines a base portion 303 that includes a slider 305 for expanding the cross-dimensional size of the base portion 303. When the slider 305 is in a closed or retracted position, the base portion 303 of the device 352 can fit within the internal dimensions of a cavity mount body 301 as shown in FIG. 23. When the slider 305 is in an extended position, the base portion 303 assumes a shape that can intermate with the internal features of the seat portion 11 of an access box 1 as shown in FIG. 24. For example, the slider 305 defines a catch portion 307 that is configured to cooperate with a protrusion 309 defined within the seat portion 11 of the access box 1 when the slider 305 is in an extended position. Thus, depending upon the mounting structure on which the spool re-orientation device 352 is going to be used, the device 352 can be adjusted in size or changed in configuration.

In the depicted embodiment, the slider 305 may define tabs or detents 311 that interact with tabs or detents 313 provided along a slider track 315 defined by the base 303 of the device 352 to define a stop position in the extended configuration. The detents 311 of the slider 305 may also interact with indents 317 provided at an opposite end of the slider track 315 to define a latch in the retracted position.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention claimed is:

1. A telecommunications wall fixture comprising:
    a body configured for mounting to a wall surface or within a wall cavity, the body defining a mounting surface generally parallel to the wall when mounted;
    a cable storage spool rotatably mounted to the body for storage and deployment of cable; and
    a device for re-orienting the rotation axis of the spool from being generally perpendicular to the mounting surface to being generally non-perpendicular to the mounting surface, wherein the re-orientation device is removably mounted to the body.

2. A wall fixture according to claim 1, wherein the telecommunications wall fixture is configured such that the spool can be stored within the body when the spool is oriented to have the rotation axis generally perpendicular to the mounting surface.

3. A wall fixture according to claim 1, wherein the body defines an opening on the mounting surface for guiding of cable toward the wall.

4. A wall fixture according to claim 1,
    a first end for mounting on the wall fixture, the first end configured to receive at least a portion of a shaft that is used to initially mount the spool to the wall fixture such that spool is oriented for rotation along a plane parallel to the mounting surface of the wall fixture and a second end configured to removably receive the spool and orient the spool for rotation along a plane generally non-parallel to the mounting surface.

5. A wall fixture according to claim 1, wherein the re-orientation device defines a movable portion for modifying the cross-dimensional size of the device.

6. A method of changing the orientation of a cable spool that is rotatably mounted on a wall fixture from a first orientation where the spool is configured to spin along a plane parallel to a mounting surface of the wall fixture to a second orientation where the spool is configured to spin along a plane generally non-parallel to the mounting surface, the method comprising:
    removing the spool from the wall fixture when the spool is in the first orientation;
    placing a removable re-orientation device in between the spool and wall fixture after removing the spool from the wall fixture; and
    attaching the spool to the re-orientation device so as to position the spool in the second orientation.

7. A method according to claim 6, wherein the wall fixture is a wall access box or a wall cavity mount body.

8. A method according to claim 6, further comprising storing the spool in the wall fixture after unwinding cable from the spool, removing the re-orientation device from the wall fixture, and moving the spool back from the second orientation to the first orientation.

9. A method according to claim 6, wherein the spool is movable toward and away from the wall fixture when in the first orientation.

* * * * *

UNITED STATES PATENT AND TRADEMARK OFFICE
CERTIFICATE OF CORRECTION

PATENT NO. : 10,712,517 B2
APPLICATION NO. : 16/444376
DATED : July 14, 2020
INVENTOR(S) : Thomas Parsons Page 1 of 1

It is certified that error appears in the above-identified patent and that said Letters Patent is hereby corrected as shown below:

In the Claims

Column 10, Line 11, Claim 4: "claim 1," should read --claim 1, wherein the re-orientation device further comprises--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*